J. H. WAGENHORST.
VEHICLE WHEEL RIM.
APPLICATION FILED NOV. 24, 1915.
1,201,121. Patented Oct. 10, 1916.
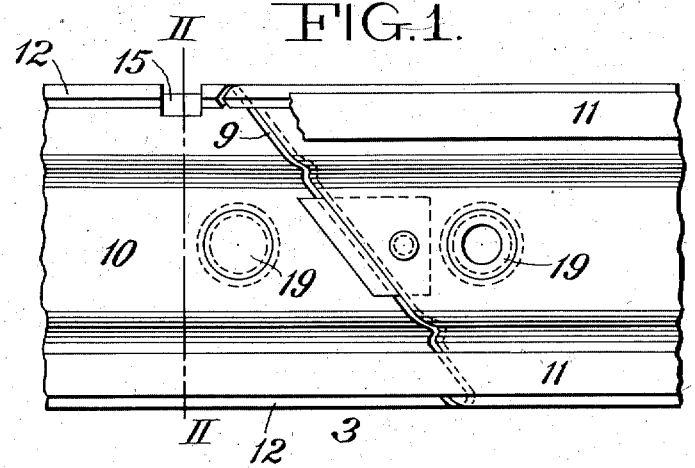
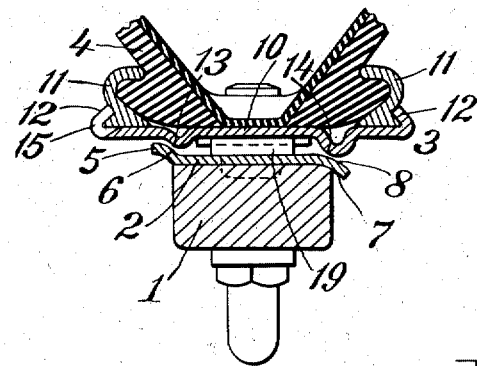
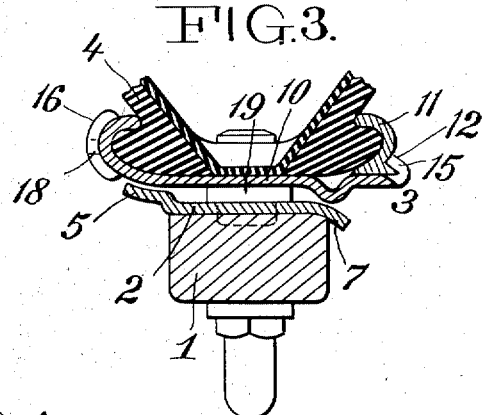
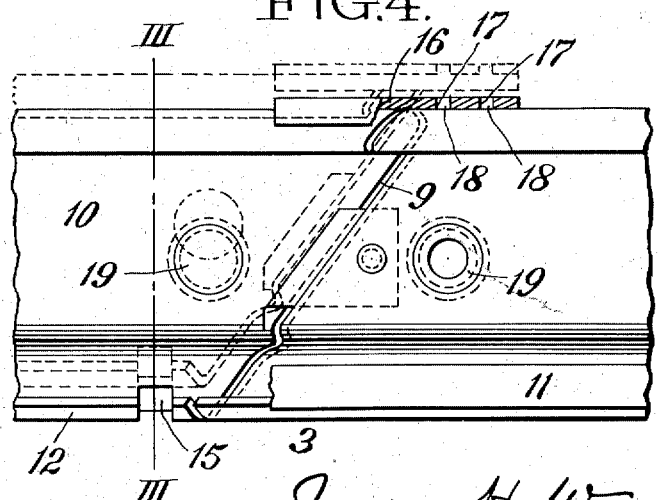
Inventor
James H. Wagenhorst
By his Attorney
Seward Davis

UNITED STATES PATENT OFFICE.

JAMES H. WAGENHORST, OF AKRON, OHIO, ASSIGNOR OF ONE-FIFTH TO THE UNITED RIM COMPANY, A CORPORATION OF OHIO, TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,201,121.     Specification of Letters Patent.     Patented Oct. 10, 1916.

Original application filed June 10, 1912, Serial No. 702,857. Divided and this application filed November 24, 1915. Serial No. 63,154.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

This invention relates to tire-carrying rims for vehicle wheels, and particularly to demountable rims of the split type in which an endless tire-retaining flange, mounted on said split rim, is retained against lateral movement by an integral flange at one edge of said rim.

In my co-pending application filed June 10, 1912, Serial Number 702,857, patented March 28, 1916, No. 1,177,461, of which this is a division, I have described and claimed various features of invention not necessary to be here described relating to the attaching of a demountable tire-carrying rim to a vehicle wheel by the use of a plurality of radial studs adapted to force portions of the rim away from the periphery of the wheel.

My present application relates to features of improvement adapted to facilitate the detachment of a tire flange from a demountable rim, either of the class described or any type of tire-carrying rim provided with endless tire-retaining flanges seated thereon and held against outward or lateral displacement by a flange upon said rim base, and consists in forming a notch in the base of the tire-carrying rim extending through the flange upon said rim base, said notch being preferably located adjacent the point where the rim base is split and permitting the insertion of a suitable tool for disengaging the endless tire-retaining flange from said rim base.

In the accompanying drawings which form a part of this specification, Figure 1 is a plan view of a portion of the tire-carrying rim showing the transverse split therein and a notch adjacent thereto; Fig. 2 is a transverse section through the rim and wheel felly, the position of the section being indicated by the line II—II of Fig. 1; Fig. 3 is a transverse section through a tire-carrying rim embodying a modified form of my invention shown in Fig. 4 and illustrating the same mounted upon the felly of a wheel, the position of the section being indicated by the line III—III in Fig. 4; Fig. 4 is a plan view of a portion of the tire-carrying rim of Fig. 3, showing the rim at the point where the same is transversely split and illustrating in dotted lines one end of the rim moved laterally to disengage the interlocking means on the ends of the rim.

Referring to the drawings in detail, the numeral 1 designates a vehicle wheel felly, which, if made of wood, is preferably provided with a metallic felly band 2 permanently mounted thereon.

3 is a demountable rim carrying the tire 4. As shown in the drawings, the felly band 2 has a raised flange 5 at one side thereof, the outer surface 6 of which forms an annular convex bearing surface. The other side of the rim is bent down as indicated at 7, its outer surface 8 forming a second annular convex bearing surface of less diameter than the convex annular bearing surface 6. The tire-carrying rim 3 is split at 9 and comprises a base or tire-seating portion 10 upon which also seat the endless reversible tire-retaining flanges 11. The rim base is provided with flanges 12 preferably inwardly hooked, as shown, which retain the endless flanges 11 in position. The flanges 11 are preferably provided with bases adapted to interlock beneath the inwardly hooked flanges 12. The rim base is provided with bearing surfaces 13 and 14 adapted to engage the bearing surfaces 6 and 8, respectively.

A notch 15 is formed in one side of the rim base to permit a tool to be inserted between the rim base and one of the endless flanges 11. By inserting a tool in this manner the end of the rim base can be pried away from the flange and forced radially inward and then laterally, as shown in Fig. 4, so that it may be grasped by the operator and collapsed, thus permitting the flanges 11 and the tire to be taken off.

In Figs. 3 and 4 I have shown a modified form of demountable rim in which the tire-carrying rim has formed at one side thereof an integral tire-retaining flange, the other side of the rim being provided with a low flange adapted to engage the endless tire-retaining flange 11. The rim, including the integral flange is transversely split, the plane of the split preferably being oblique both to a radius and to the edges of the rim. The rim also has a notch 15 formed therein for the reception of a tool. For preventing separation of the ends of the rim at the side of the latter opposite to that carrying the endless tire-retaining flange, I preferably provide suitable locking means which, as shown, comprise a plate 16 secured to one end of the rim, preferably upon the outside of the integral flange thereof, this plate overlapping a portion of the other end of the rim and having one or more holes 17 therein which receive pins 18 projecting from the other end of the rim. When the ends of the rim are brought into alinement these pins enter the holes in the locking plate 16 and prevent circumferential separation of the ends of the rim. By moving the end of the rim carrying the locking plate laterally, however, as shown in dotted lines in Fig. 4, the ends of the rim may be disengaged and the rim collapsed sufficiently to permit the endless flange 11 and the tire to be removed. The rim shown in these figures may be secured to the vehicle wheel in any suitable manner.

I have shown herein the means disclosed in my companion case above referred to, comprising a plurality of radial studs 19 adapted to force portions of the rim away from the felly band when other portions of the rim are supported out of contact with the periphery of the wheel by adjustable studs, not here shown, thus causing the rim to seat upon the non-adjustable studs 19 and also upon the periphery of the wheel between such studs and the adjacent adjustable studs.

I claim:—

1. A tire-carrying rim for resilient tires comprising a transversely split rim base having an integral flange at the edge thereof, and an endless tire-retaining flange mounted on said rim base and retained against lateral movement by said integral flange, said rim base having a notch formed in one side thereof extending through said integral flange, said notch being located near the point where the rim base is split and permitting the insertion of a tool for disengaging the rim base from said endless tire-retaining flange.

2. A tire-carrying transversely split rim base for resilient tires, and a detachable tire-retaining flange mounted thereon and seating against an integral portion thereof, said portion permitting the insertion of a tool therethrough at the base of said tire-retaining flange.

3. A transversely split tire-carrying rim having an inturned edge notched to a point below the base of the rim.

4. A transversely split tire-carrying rim having a flanged edge notched to a point below the base of the rim at a point adjacent the split.

JAMES H. WAGENHORST.

It is hereby certified that Letters Patent No. 1,201,121, granted October 10, 1916, upon the application of James H. Wagenhorst, of Akron, Ohio, for an improvement in "Vehicle-Wheel Rims," were erroneously issued to The United Rim Company, The B. F. Goodrich Company, The Goodyear Tire & Rubber Company, and The United States Tire Company, whereas said Letters Patent should have been issued to the inventor, *said Wagenhorst and The B. F. Goodrich Company, The Goodyear Tire & Rubber Company, and The United States Tire Company*, jointly, said Wagenhorst being owner of *one-fifth* interest in said invention, as shown by the records of assignments in this office; and that the said Letters Patent should be read with this correction therein that the same may conform to the record of the case in the Patent Office.

Signed and sealed this 21st day of November, A. D., 1916.

[SEAL.]

F. W. H. CLAY,
*Acting Commissioner of Patents.*

Cl. 152—21.